United States Patent
Schlatter et al.

(10) Patent No.: US 10,284,587 B1
(45) Date of Patent: May 7, 2019

(54) SYSTEMS AND METHODS FOR RESPONDING TO ELECTRONIC SECURITY INCIDENTS

(71) Applicant: Symantec Corporation, Mountain View, CA (US)

(72) Inventors: Brian Schlatter, Playa Vista, CA (US); Adam Glick, Culver City, CA (US); Akshata Krishnamoorthy Rao, Mountain View, CA (US); Feng Li, Ontario (CA)

(73) Assignee: Symantec Corporation, Mountain View, CA (US)

( * ) Notice: Subject to any disclaimer, the term of this patent is extended or adjusted under 35 U.S.C. 154(b) by 132 days.

(21) Appl. No.: 15/265,346

(22) Filed: Sep. 14, 2016

(51) Int. Cl.
*H04L 29/00* (2006.01)
*H04L 29/06* (2006.01)
*G06F 3/0482* (2013.01)

(52) U.S. Cl.
CPC ........ *H04L 63/1433* (2013.01); *G06F 3/0482* (2013.01); *H04L 63/1441* (2013.01)

(58) Field of Classification Search
CPC  H04L 63/1433; H04L 63/1441; G06F 3/0482
USPC .......................................................... 726/25
See application file for complete search history.

(56) References Cited

U.S. PATENT DOCUMENTS

2016/0101053 A1* 4/2016 Xu .......................... C07C 41/26
424/94.1

OTHER PUBLICATIONS

Using Data Science Techniques for the Automatic Clustering of it Alertshttps://blog.pivotal.io/data-science-pivotal/products/using-data-science-techniques-for-the-automatic-clustering-of-it-alerts; Jun. 5, 2014.
SecBI; http://www.secbi.com/product/; As accessed on Aug. 11, 2016.
Matteo Dell'Amico, et al; Systems and Methods for Managing Computer Security of Client Computing Machines; U.S. Appl. No. 15/281,130, filed Sep. 30, 2016.
Tamersoy et al., Guilt by Association: Large Scale Malware Detrection by Mining File-relation Graphs; Aug. 2014.
Lulli et al., Scalable k-NN based text clustering; Oct. 2015.
Fowlkes et al., Spectral Grouping Using the Nystrom Method; Feb. 1, 2004.

(Continued)

*Primary Examiner* — Anthony D Brown
*Assistant Examiner* — Michael D Anderson
(74) *Attorney, Agent, or Firm* — FisherBroyles,LLP

(57) ABSTRACT

The disclosed computer-implemented method for responding to electronic security incidents may include (i) identifying a plurality of security incidents that each occurred within a computing environment and call for a security response, (ii) establishing relationships among the plurality of security incidents by, for each security incident, (a) calculating a feature vector indicating at least one feature of the security incident, (b) using the feature vector to calculate a degree of similarity between the security incident and an additional security and (c) creating an association between the security incident and the additional security incident that reflects the degree of similarity between the security incident and the additional security incident, and (iii) triggering, based on the relationships among the plurality of security incidents, a security action that responds to at least the security incident and the additional security incident. Various other methods, systems, and computer-readable media are also disclosed.

20 Claims, 7 Drawing Sheets

(56) References Cited

OTHER PUBLICATIONS

Julisch et al.; Mining Intrusion Detection Alarms for Actionable Knowledge; Jul. 2002.
Jaccard index; https://en.wikipedia.org/wiki/Jaccard_index, last retrieved Sep. 19, 2016; Dec. 15, 2005.

* cited by examiner

SYSTEMS AND METHODS FOR RESPONDING TO ELECTRONIC SECURITY INCIDENTS

BACKGROUND

Individuals and organizations generally protect their computers and/or networks using a variety of software security systems, such as firewalls and antivirus systems. These security systems may automatically monitor activity on computers and/or networks, and detect potentially harmful, malicious, or otherwise abnormal activity. Security systems may require an administrator to respond to certain incidents.

Unfortunately, software security systems that protect large numbers of computers and/or large networks may generate commensurately large numbers of security incidents. Administrators may become overwhelmed by the sheer volume of incidents that require their attention. Even software security systems that protect only a single device, such as those protecting a personal computer, may require significant amounts of user intervention. The instant disclosure, therefore, identifies and addresses a need for systems and methods for responding to electronic security incidents.

SUMMARY

As will be described in greater detail below, the instant disclosure describes various systems and methods for responding to electronic security incidents. In one example, a computer-implemented method for responding to electronic security incidents may include (i) identifying, by a software security system, a group of security incidents that each occurred within a computing environment and call for a security response, (ii) establishing relationships among the security incidents by, for each security incident in the security incidents, (a) calculating a feature vector that indicates at least one feature of the security incident, (b) using the feature vector to calculate a degree of similarity between the security incident and an additional security incident in the security incidents and (c) creating an association between the security incident and the additional security incident that reflects the degree of similarity between the security incident and the additional security incident, and (iii) triggering, based on the relationships among the security incidents, a security action that responds to at least the security incident and the additional security incident. In some embodiments, creating the association between the security incident and the additional security incident may be based on the degree of similarity satisfying a similarity threshold.

In some examples, the security action may include generating a report containing a group of related security incidents that are associated with the security incident and the additional security incident. The computer-implemented method may perform a variety of actions as part of generating the report. For example, generating the report may include sorting the related security incidents based on the degree of similarity of each incident to the security incident. In some embodiments, the computer-implemented method may further include providing the report to an administrator of at least one computing system involved in the security incident. In such embodiments, providing the report to the administrator may include displaying the contents of the report through a graphical user interface that enables the administrator to respond simultaneously to at least the security incident and the additional security incident.

The security action may include a variety of other tasks. For example, the security action may include automatically adjusting the similarity threshold based on the number of additional security incidents that are associated with the security incident to generate an actionable list of security incidents that are associated with the security incident. Additionally or alternatively, the security action may include generating a new security incident based on the relationship between at least the security incident and the additional security incident.

The feature vector may account for a variety of features of the security incident. For example, the feature vector may account for (i) a hostname of a computing device affected by the security incident, (ii) a classification of the computing device affected by the security incident, (iii) an Internet Protocol (IP) address that, when accessed, triggered the security incident, (iv) a domain name that, when accessed, triggered the security incident, (v) a Uniform Resource Locator (URL) that, when accessed, triggered the security incident, (vi) a user of a computing system affected by the security incident, (vii) a group of users affected by the security incident, (viii) a physical location of computing systems affected by the security incident, (ix) an e-mail address that facilitated the security incident, (x) a file that, when present on a victim computing system, triggered the security incident, (xi) a software application that, when present on the victim computing system, triggered the security incident, and/or (xii) a digital signature that represents a signing authority that signed files involved in the security incident and the additional security incident.

In one embodiment, a system for implementing the above-described method may include (i) an identification module, stored in memory, that identifies, by a software security system, a group of security incidents that each occurred within a computing environment and call for a security response, (ii) a vector module that calculates a feature vector that indicates at least one feature of the security incident, (iii) a similarity module, stored in memory, that uses the feature vector to calculate a degree of similarity between the security incident and an additional security incident in the security incidents, (iv) a creation module, stored in memory, that creates an association between the security incident and the additional security incident that reflects the degree of similarity between the security incident and the additional security incident, (v) a security module, stored in memory, that triggers, based on the relationships among the security incidents, a security action that responds to at least the security incident and the additional security incident, and (vii) at least one physical processor configured to execute the identification module, the vector module, the similarity module, the creation module, and the security module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (i) identify, by a software security system, a group of security incidents that each occurred within a computing environment and call for a security response, (ii) establish relationships among the security incidents by, for each security incident in the security incidents, (a) calculating a feature vector that indicates at least one feature of the security incident, (b) using the feature vector to calculate a degree of similarity between the security incident and an additional security incident in the security incidents and (c)

creating an association between the security incident and the additional security incident that reflects the degree of similarity between the security incident and the additional security incident, and (iii) trigger, based on the relationships among the security incidents, a security action that responds to at least the security incident and the additional security incident.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of example embodiments and are a part of the specification. Together with the following description, these drawings demonstrate and explain various principles of the instant disclosure.

Figure 1:
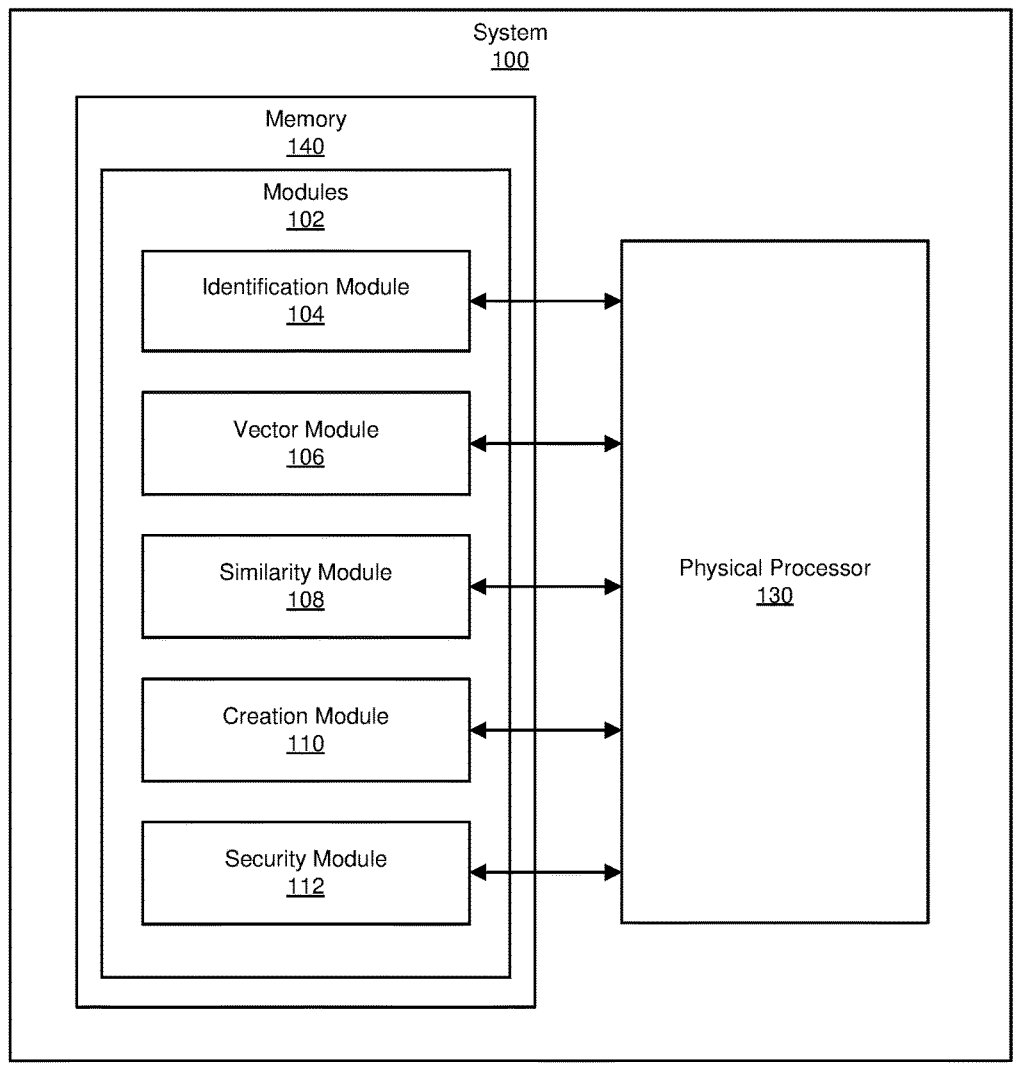
FIG. 1 is a block diagram of an example system for responding to electronic security incidents.

Throughout the drawings, identical reference characters and descriptions indicate similar, but not necessarily identical, elements. While the example embodiments described herein are susceptible to various modifications and alternative forms, specific embodiments have been shown by way of example in the drawings and will be described in detail herein. However, the example embodiments described herein are not intended to be limited to the particular forms disclosed. Rather, the instant disclosure covers all modifications, equivalents, and alternatives falling within the scope of the appended claims.

DETAILED DESCRIPTION OF EXAMPLE EMBODIMENTS

The present disclosure is generally directed to systems and methods for responding to electronic security incidents. As will be described in greater detail below, the systems and methods described herein may utilize a broad array of features extracted from detected security incidents in order to establish similarity relationships between the security incidents. The systems and methods described herein may improve the functioning of a software security system by leveraging these similarity relationships to enable the software security system to respond appropriately to clusters of related incidents. Furthermore, the similarity relationships may enable a software security system to present an administrator with an actionable list of items that require their attention, even in the face of large volumes of security incidents.

Figure 2:
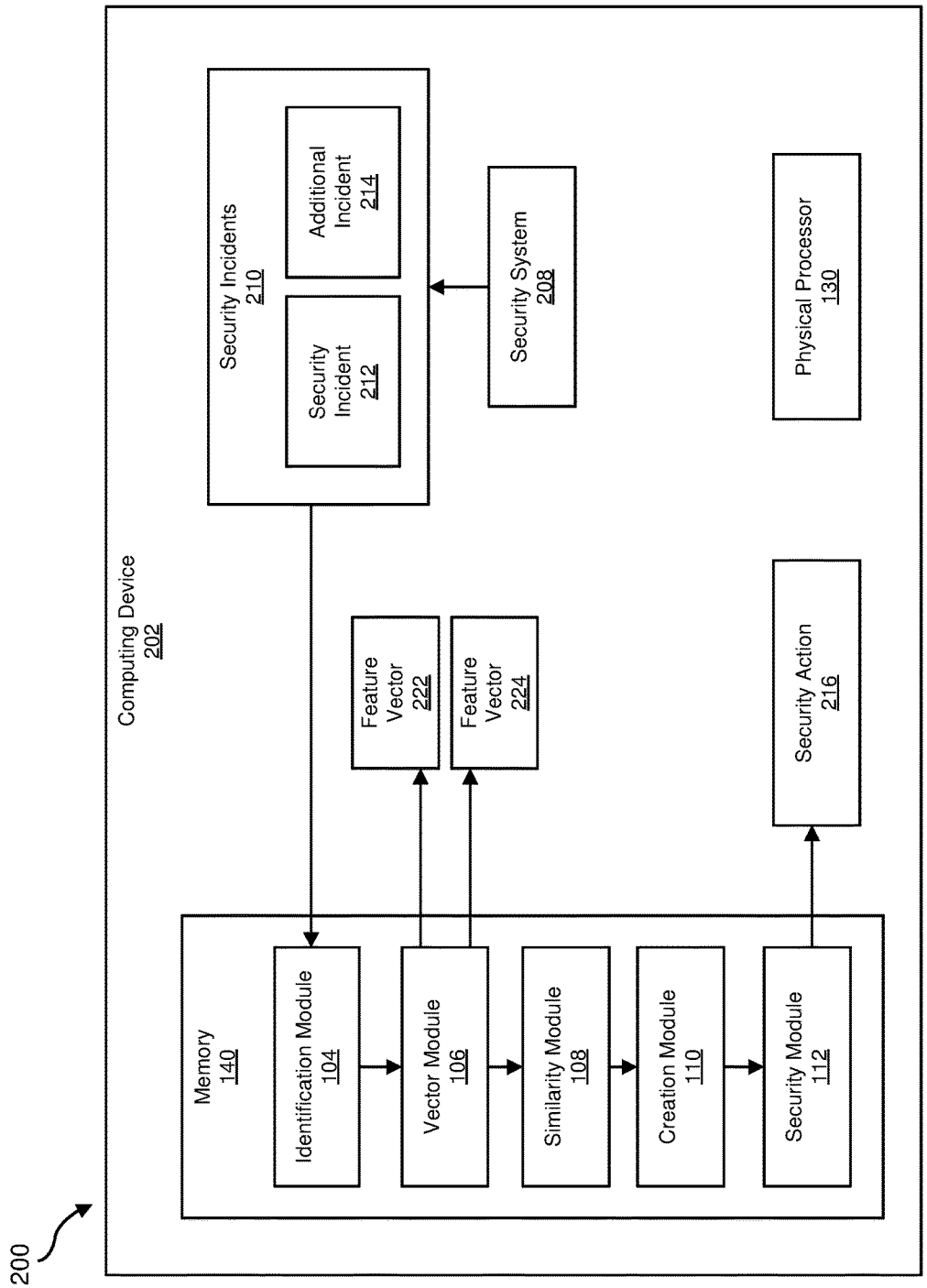
FIG. 2 is a block diagram of an additional example system for responding to electronic security incidents.
Figure 3:
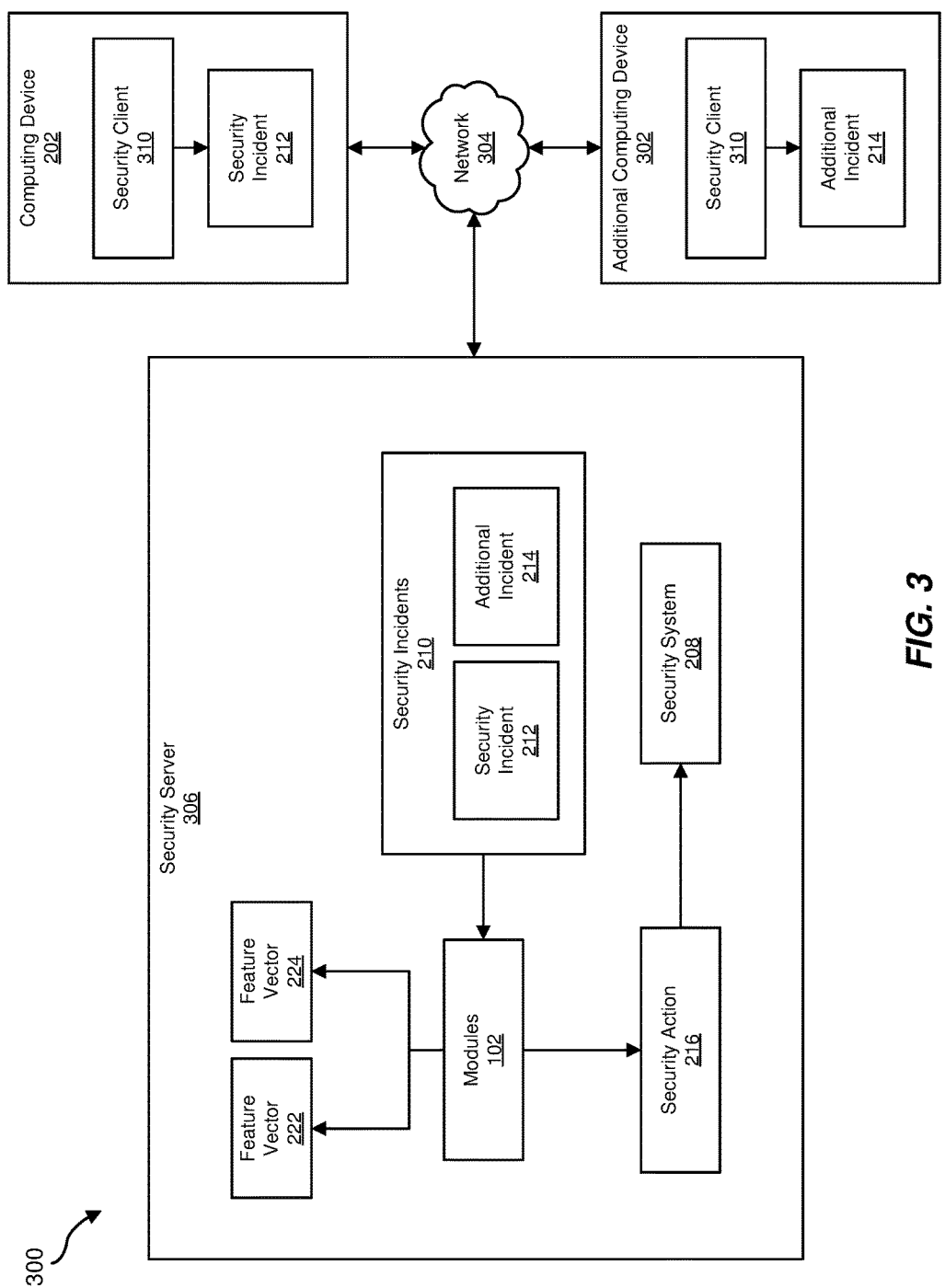
FIG. 3 is a block diagram of an example computing system for responding to electronic security incidents involving a server in communication with client devices.

The following will provide, with reference to FIGS. 1-3, detailed descriptions of example systems for responding to electronic security incidents. Detailed descriptions of corresponding computer-implemented methods will also be provided in connection with FIG. 4. Detailed descriptions of user interfaces for addressing related security incidents will be provided in connection with FIG. 5. In addition, detailed descriptions of an example computing system and network architecture capable of implementing one or more of the embodiments described herein will be provided in connection with FIGS. 6 and 7, respectively.

FIG. 1 is a block diagram of an example system 100 for responding to electronic security incidents. As illustrated in this figure, system 100 may include one or more modules 102 for performing one or more tasks. For example, and as will be explained in greater detail below, system 100 may include an identification module 104 that identifies, by a software security system, a collection of security incidents that each occurred within a computing environment and call for a security response. System 100 may additionally establish relationships among the collection of security incidents through the use of a vector module 106, a similarity module 108, and a creation module 110. Vector module 106 may, for each incident in the collection of security incidents, calculate a feature vector that indicates at least one feature of the security incident. Similarity module 108 may use the feature vector to calculate a degree of similarity between the security incident and an additional security incident. Creation module 110 may create an association between the security incident and the additional security incident that reflects the degree of similarity between the security incident and the additional security incident. System 100 may also include a security module 112 that triggers, based on the relationships among the collection of security incidents, a security action that responds to at least the security incident and the additional security incident. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent modules stored and configured to run on one or more computing devices, such as the devices illustrated in FIG. 2 (e.g., computing device 202) and/or the devices illustrated in FIG. 3 (e.g., security server 306). One or more of modules 102 in FIG. 1 may also represent all or portions of one or more special-purpose computers configured to perform one or more tasks.

As illustrated in FIG. 1, example system 100 may also include one or more memory devices, such as memory 140. Memory 140 generally represents any type or form of volatile or non-volatile storage device or medium capable of storing data and/or computer-readable instructions. In one example, memory 140 may store, load, and/or maintain one or more of modules 102. Examples of memory 140 include, without limitation, Random Access Memory (RAM), Read Only Memory (ROM), flash memory, Hard Disk Drives, (HDDs), Solid-State Drives (SSDs), optical disk drives, caches, variations or combinations of one or more of the same, and/or any other suitable storage memory.

As illustrated in FIG. 1, example system 100 may further include one or more physical processors, such as physical processor 130. Physical processor 130 generally represents any type or form of hardware-implemented processing unit capable of interpreting and/or executing computer-readable instructions. In one example, physical processor 130 may access and/or modify one or more of modules 102 stored in memory 140. Additionally or alternatively, physical processor 130 may execute one or more of modules 102 to facilitate responding to electronic security incidents. Examples of physical processor 130 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Example system 100 in FIG. 1 may be implemented in a variety of ways. For example, all or a portion of example system 100 may represent portions of example system 200 in FIG. 2. As shown in FIG. 2, system 200 may include a computing device 202. In one example, all or a portion of the functionality of modules 102 may be performed by computing device 202 and/or any other suitable computing system. As will be described in greater detail below, one or more of modules 102 from FIG. 1 may, when executed by at least one processor of computing device 202, enable computing device 202 to establish relationships between various security incidents, thus providing administrators and security systems enhanced methods by which to respond to the security incidents. For example, and as will be described in greater detail below, identification module 104 may identify, by a security system 208, a collection of security incidents 210 that each occurred within a computing environment (e.g., computing device 202 and/or a network of computing devices) and call for a security response. System 200 may establish relationships among each incident in security incidents 210 by, for each security incident in security incidents 210, calculating a feature vector that indicates at least one feature of the security incident. These security incidents and associated feature vectors are illustrated in FIG. 2 as security incident 212 and additional incident 214, corresponding to feature vectors 222 and 224, respectively. Similarity module 108 may use the calculated feature vectors to calculate a degree of similarity between security incident 212 and additional incident 214. Creation module 110 may create an association between security incident 212 and additional incident 214 that reflects the degree of similarity between the feature vectors of security incident 212 and additional incident 214. Security module 112 may trigger, based on the relationships among security incidents 210, a security action 216 that responds to at least security incident 212 and additional incident 214.

Computing device 202 generally represents any type or form of computing device capable of reading computer-executable instructions. For example, computing device 202 may be a personal computer configured to run a software security suite. Alternatively, computing device 202 may be a security server that allows administrators to respond to security incidents across a network of computing devices. Additional examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, variations or combinations of one or more of the same, and/or any other suitable computing device. Computing device 202 may be configured to execute a software security system to detect, prevent, or otherwise address malicious and/or abnormal activity on computing device 202.

Security system 208 generally represents any type or form of software and/or hardware that is configured to detect, prevent, or otherwise address malicious and/or abnormal activity within a computing system. In some embodiments, security system 208 may protect a single computing device, such as computing device 202 in FIG. 2. Alternatively, security system 208 may protect multiple computing devices that are connected via a network, such as the computing system illustrated in FIG. 3. Examples of security system 208 include, without limitation, antivirus software, firewalls, intrusion detection/prevention software, data-loss prevention software, anti-tampering software, access-control software, combinations of one or more of the same, or any other software that is configured to protect a computing system against intrusion and/or unauthorized use of resources. Security system 208 may detect security incidents that represent a potential intrusion and/or unauthorized use of the protected computing system.

Security incidents 210, security incident 212, additional incident 214, as well as the term "security incident" and its derivatives generally represent events detected by a software security system that may be a potential intrusion or other unauthorized use of a computing system protected by security system 208. Security system 208 may capture a variety of information as part of detecting a security incident, as will be described in greater detail below. Security system 208 may record this information in a log or other incident file, and provide all or a portion of this incident file to identification module 104. Examples of security incidents include, without limitation, a building security system detecting an unauthorized person in a restricted area, antivirus software detecting a potentially malicious file, firewall software detecting possible intrusion attempts, data-loss prevention software detecting that a user may have caused an information leak, access-control software detecting a failed login attempt to a user account, or any other type or form of abnormal activity detected by a software security system. As will be described in greater detail below, the systems and methods described herein may generate associations between security incidents based on a calculated degree of similarity between those security incidents.

All or a portion of example system 100 may additionally or alternatively represent portions of example system 300 in FIG. 3. As illustrated in FIG. 3, all or a portion of modules 102 may execute as part of a security server 306 that manages security responses for client devices, such as computing device 202 and/or additional computing device 302. Security server 306 may communicate with these client devices via a network 304. The client devices may be programmed with a security client 310 that detects security incidents on the client device and reports details about the incident to security server 306. Security client 310 may additionally or alternatively facilitate the execution of security action 216 on the appropriate computing device.

Security client 310 may detect security incident 212 on computing device 202, and additional incident 214 on an additional computing device 302, and provide these security incidents to security server 306 as part of security incidents 210. Modules 102 may then establish relationships between each security incident based on feature vectors and trigger security action 216 through security system 208, as described in greater detail above and as will be described in further detail below. Security system 208 may then, as part of security action 216, prompt security client 310 to take appropriate actions on the relevant client devices.

Security server 306 generally represents any type or form of computing device that is capable of determining whether various security incidents are related to each other, and allowing an administrator to simultaneously respond to several related security incidents. Although illustrated as a single entity in FIG. 3, security server 306 may include and/or represent a plurality of servers that work and/or operate in conjunction with one another.

Network 304 generally represents any medium or architecture capable of facilitating communication or data transfer. In one example, network 304 may facilitate communication between computing device 202, additional computing device 302, and security server 306. In this example, network 304 may facilitate communication or data transfer using wireless and/or wired connections. Examples of network 304 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network.

Figure 4:
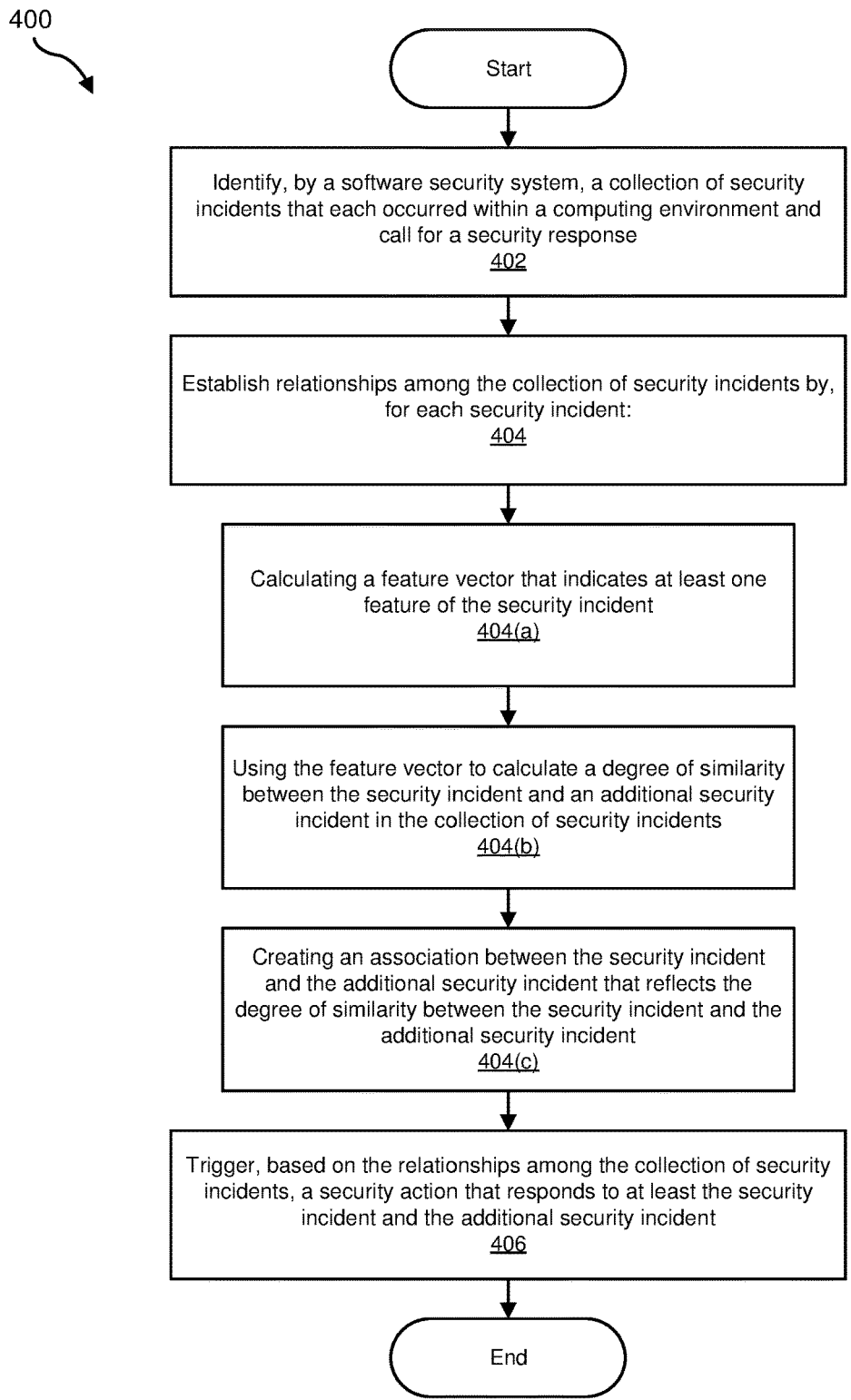
FIG. 4 is a flow diagram of an example method for responding to electronic security incidents.

FIG. 4 is a flow diagram of an example computer-implemented method 400 for responding to electronic security incidents. The steps shown in FIG. 4 may be performed by any suitable computer-executable code and/or computing system, including system 100 in FIG. 1, system 200 in FIG. 2, system 300 in FIG. 3, and/or variations or combinations of one or more of the same. In one example, each of the steps shown in FIG. 4 may represent an algorithm whose structure includes and/or is represented by multiple sub-steps, examples of which will be provided in greater detail below.

As illustrated in FIG. 4, at step 402, one or more of the systems described herein may identify, by a software security system, a collection of security incidents that each occurred within a computing environment and call for a security response. For example, identification module 104 may, as part of computing device 202 in FIG. 2, identify, by security system 208, security incidents 210 that each occurred within a computing environment and call for a security response.

Identification module 104 may identify security incidents 210 in a variety of contexts. In some embodiments, identification module 104 may execute as part of auxiliary software that operates in parallel to a software security system, such as adjunct software for antivirus software and/or firewall software. In these embodiments, identification module 104 may request access to a corpus of security incidents detected by the software security system, and use these security incidents as security incidents 210. Additionally or alternatively, identification module 104 may be integrated into the software security system. In these examples, identification module 104 may access a database of security incidents maintained by the software security system and use these incidents as security incidents 210.

Regardless of the context within which identification module 104 identifies security incidents 210, a user or administrator may, in some examples, manually direct identification module 104 to use certain security incidents as security incidents 210. For example, a user or administrator may, through a graphical user interface, select and designate specific security incidents for use as security incidents 210. Alternatively, identification module 104 may automatically identify security incidents for use as security incidents 210 without the need for user intervention. In examples where identification module 104 automatically identifies security incidents, identification module 104 may use a variety of factors when determining which security incidents to use as part of security incidents 210. For example, identification module 104 may select only high priority incidents, incidents that occurred within a specified timeframe, or use any other suitable metric or rule set for selecting security incidents for use as security incidents 210.

Security incidents may call for a security response. The term, "security response," as used herein, generally refers to any action undertaken by a software security system and/or system administrator to remove, ameliorate, or otherwise address a security incident. Security responses may vary based on the nature of the security incident. For example, if an automated motion-detection system in a building detects movement during a time when no employees should be in the building, an appropriate security response may consist of notifying police and/or building security personnel. As an additional example, an antivirus system detecting a malicious file may be resolved by quarantining or deleting the file. Similarly, security incidents stemming from a particular software suite may be addressed by updating the software suite to its latest version. As a further example, detecting multiple failed login attempts to a user account within a certain period of time may be addressed by notifying the user and/or locking the account from further login attempts until released by an administrator.

At step 404 in FIG. 4, one or more of the systems described herein may establish relationships among the collection of security incidents by performing steps 404(a), 404(b), and 404(c), as will be described in greater detail below.

At step 404(a) in FIG. 4, one or more of the systems described herein may, for each security incident in the collection of security incidents, calculate a feature vector that indicates at least one feature of the security incident. For example, vector module 106 may, as part of computing device 202 in FIG. 2, calculate feature vectors 222 and 224 for security incident 212 and additional incident 214, respectively.

Vector module 106 may calculate the feature vector in a variety of ways. In some examples, vector module 106 may simply record each appropriate feature in the appropriate dimension of the feature vector. Additionally or alternatively, vector module 106 may assign a numerical value to each feature represented in the feature vector.

Furthermore, vector module 106 may calculate the feature vector in a variety of contexts. For example, vector module 106 may calculate a feature vector for each security incident as the incident is detected, and store the feature vector in a database for future use, such as when an administrator requests a list of security incidents that are related to a particular security incident. Alternatively, vector module 106 may only calculate the feature vectors when necessary. For example, vector module 106 may calculate feature vectors for each security incident in a corpus of security incidents provided to vector module 106 by an administrator who seeks to evaluate similarities between the incidents in the corpus of security incidents.

Vector module 106 may account for a variety of features when calculating feature vectors for security incidents. Each feature indicates information about the security incident that may be used as part of determining whether two security incidents are related. Security incidents that share similar features are likely to be related in some way, as will be described below in connection with detailed descriptions of each feature.

The feature vector may include a hostname of a computing device affected by the security incident. Multiple security incidents that affect the same computing device may be part of a coordinated attack against that computing device. Additionally or alternatively, users of that computing device may engage in behavior that causes security incidents on the computing device.

The feature vector may also include a classification of the computing device affected by the security incident. For example, multiple security incidents may affect various computing devices each classified as critical assets. Security incidents affecting these computing devices may be indicative of an effort to gain illegitimate access to an organization's secure information.

In some examples, the feature vector may include an Internet Protocol (IP) address, domain name, and/or Uniform Resource Locator (URL) that, when accessed, triggered the security incident. Security incidents stemming from these features may indicate that the computing device represented by the IP address, domain name, and/or URL is malicious, compromised, or otherwise likely to cause further security incidents if accessed again.

Furthermore, the feature vector may include the name of a user and/or group of users of a computing system affected by the security incident. If the same users are associated with multiple security incidents, those users may be engaging in behavior that causes the security incidents. Even if different security incidents are associated with different users, security incidents affecting similar users (e.g., administrator users, users with access to sensitive information, etc.) may be indicative of a broader attack pattern.

The feature vector may additionally include a physical location of computing systems affected by the security incident. Computing systems in the same physical location that are affected by security incidents may share faulty hardware and/or software. Additionally or alternatively, the physical location may contain sensitive resources (e.g., bank vaults, government facilities, corporate research laboratories, etc.) that are protected by the affected computing systems. Security incidents affecting these computing systems may represent a coordinated attempt to gain unauthorized access and/or cause harm to the sensitive resources.

In some examples, the feature vector may include an e-mail address that facilitated the security incident. The e-mail address may include an e-mail address that sent and/or forwarded an e-mail that triggered the security incident. For example, a particular e-mail address may send a phishing e-mail in an attempt to affect a computing system. Alternatively, the e-mail address may include an e-mail address that received an e-mail that triggered the security incident. In these examples, a user of the e-mail address may have been targeted as part of an attack and/or exhibited behavior that caused the security incidents.

Additionally or alternatively, the feature vector may include descriptions of a file that, when present on a victim computing system, triggered the security incident. In these examples, the file may cause or otherwise facilitate security incidents. For example, the file may be part of a rootkit that allows attackers to gain illegitimate access to a computing system. As an additional example, the file may be infected with malicious software that causes harm to computing systems. In any case, if copies and/or versions of the same file are involved in different security incidents, those security incidents may be related.

Furthermore, the feature vector may include descriptions of a software application that, when present on the victim computing system, triggered the security incident. As described above in connection with the file, various software applications may contain code, either by design or infection, that compromises the security or operation of a computing system. The software applications may additionally or alternatively be legitimate applications that are vulnerable to attack due to a bug or other security vulnerability.

In some embodiments, the feature vector may include a digital signature that represents a signing authority that signed files involved in the security incident and the additional security incident. Security events that involve different files may nevertheless be related if the same signing authority signed those files.

At step 404(b) in FIG. 4, one or more of the systems described herein may use the feature vector to calculate a degree of similarity between the security incident and an additional security incident in the plurality of security incidents. For example, similarity module 108 may, as part of computing device 202 in FIG. 2, use feature vectors 222 and 224 to calculate a degree of similarity between security incident 212 and an additional incident 214.

The phrase, "degree of similarity," as used herein, generally refers to any mathematical metric of measuring the similarity between two feature vectors. A degree of similarity may be a single numerical value representing an overall level of similarity between the feature vectors. In other words, a degree of similarity may represent a calculated distance between two feature vectors. Similarity module 108 may use any suitable mathematical operation as part of comparing the feature vectors of two security incidents. For example, similarity module 108 may assign numerical values to each component of the feature vector and use a distance function such as cosine similarity as part of calculating the degree of similarity between security incident 212 and additional incident 214.

In some embodiments, similarity module 108 may calculate the similarity of security incidents relative to a specific security incident. Similarity module 108 may select this specific security incident in a variety of ways. In some examples, Similarity module 108 may select a high-priority security incident as the specific security incident. Additionally or alternatively, a user may direct the systems and methods described herein to use a particular security incident as the specific security incident. As a specific example, a user may select a security incident from a list of security incidents, and the systems and methods described herein may calculate the similarity of other security incidents relative to that security incident.

At step 404(c) in FIG. 4, one or more of the systems described herein may create an association between the security incident and the additional security incident that reflects the degree of similarity between the security incident and the additional security incident. For example, creation module 110 may, as part of computing device 202 in FIG. 2, create an association between security incident 212 and additional incident 214 that reflects the degree of similarity between security incident 212 and additional incident 214.

The term, "association," as used here, generally refers to any indication that two or more security incidents are likely to be related. In some embodiments, creation module 110 may generate associations between similar security incidents by adding representations of associated security incidents to a list or database. Additionally or alternatively, creation module 110 may edit information about the security incidents or even information within the security incidents themselves to include references to associated security incidents.

Creation module 110 may create the association based on the degree of similarity between the security incidents as calculated by similarity module 108. For example, creation module 110 may create the association between the security incident and the additional security incident based on the degree of similarity satisfying a similarity threshold. In other words, creation module 110 may only associate security incidents if they represent events that are sufficiently similar. Creation module 110 may, in some examples, automatically adjust this similarity threshold in order to produce an actionable list of security incidents, as will be described in greater detail below.

At step 410 in FIG. 4, one or more of the systems described herein may trigger, based on the relationships among the plurality of security incidents, a security action that responds to at least the security incident and the additional security incident. For example, security module 112 may, as part of computing device 202 in FIG. 2, trigger, based on the relationships among the plurality of security incidents 210, security action 216 that responds to at least security incident 212 and additional incident 214.

Security module 112 may trigger a variety of security actions. In some embodiments, security module 112 may trigger the generation of a report detailing a list of related security incidents that are associated with the security incident and the additional security incident. As described above, other elements of modules 102 may have calculated the similarity of each security incident in the collection of security incidents relative to a particular security incident. In such examples, security module 112 may generate a report listing security incidents that are associated with the particular security incident. Furthermore, security module 112 may sort the associated security incidents based on the degree of similarity of each incident to the particular security incident. For example, when displaying the security incidents represented in the report to an administrator through a user interface, security module 112 may display security incidents that are more closely related to the particular security incident closer to the top of the list.

In some embodiments, security module 112 may simply provide all or a portion of the report to an administrator of at least one computing system involved in the security incident. For example, security module 112 may deliver a report containing feature vectors for a collection of security incidents to the administrator's personal workstation. The administrator may then select a particular security incident, causing software installed on their workstation to calculate similarity values for the other security incidents in the report relative to the selected incident. Additionally or alternatively, security module 112 may send a text, e-mail, or other form of alert to an administrator of the computing system to alert them that an actionable list of security incidents is ready for their review.

In some embodiments, security module 112 may provide the report to the administrator by displaying the contents of the report through a graphical user interface that enables the administrator to respond simultaneously to at least the security incident and the additional security incident. For example, security module 112 may cause a software security system to display a list of security incidents ranked by similarity to a particular security incident. The software security system may allow an administrator to select multiple security incidents from that list and respond simultaneously to each selected security incident. As a specific example, security module 112 may cause an antivirus software security system such as NORTON ANTIVIRUS to display a list of potentially harmful files that were detected on a computing system. The antivirus software may display the list of potentially harmful files as ranked by similarity to a high priority incident involving a particular file that is known to be malicious. The antivirus software security system may then allow the administrator to select multiple files and quarantine all of them as part of a single action.

In embodiments where creation module 110 uses a similarity threshold as part of determining whether to create an association between two security incidents, security module 112 may undertake security actions that automatically adjust this threshold in order to create an actionable list of security incidents while still retaining a measure of specificity. Namely, triggering the security action may include automatically adjusting the similarity threshold based on the number of additional security incidents that are associated with the selected security incident to generate an actionable list of security incidents that are associated with the selected security incident. For example, a user may specify a seed level of similarity that must exist between two security incidents in order for creation module 110 to create an association between the two security incidents. The user may also specify that lists of related security incidents should be roughly ten items in length. If, for example, the systems and methods described herein generate a list of fifteen security incidents, security module 112 may automatically increase the stringency of the similarity threshold in order to reduce the number of security incidents that are represented in future iterations of the list.

Figure 5:
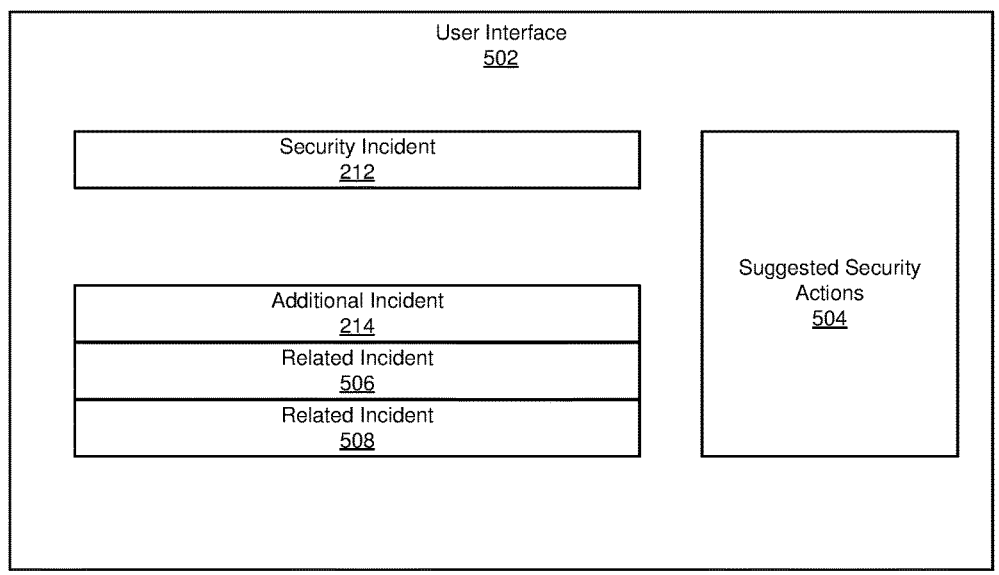
FIG. 5 is a block diagram of an example user interface for responding to electronic security incidents.

An example user interface is illustrated in FIG. 5. As shown in FIG. 5, a software security system may present lists of security incidents to an administrator through a user interface 502. The administrator may have selected security incident 212 as a seed incident, causing modules 102 to evaluate additional incident 214, related incident 506, related incident 508, and other security incidents for similarity to security incident 212. Creation module 110 may create associations between security incident 212 and additional incident 214, related incident 506, and related incident 508 based on degrees of similarity to security incident 212 as calculated by similarity module 108. Creation module 110 may have not created associations between security incident 212 and other, less-related security incidents. Those less-related security incidents may accordingly not be displayed via user interface 502. An administrator may be able to select various security incidents related to security incident 212 through user interface 502. Security module 112 may display the related incidents along with a list of suggested security actions 504. This list of suggested security actions may include a variety of options, such as quarantine all files involved in the selected incidents, block an IP address associated with the selected incidents, generate a new security incident based on the selected security incidents, etc.

Certain security incidents may be indicative of a broader and/or more sophisticated attack, such as and advanced persistent threat (APT). Additionally or alternatively, a large number of security incidents may be traceable back to a common source. In some embodiments, security module 112 may address such issues by generating a new security incident based on the relationship between at least the security incident and the additional security incident. This new security incident may incorporate several related security incidents, such as all security incidents relating to a particular IP address. Security module 112 may then perform a variety of tasks regarding this new incident, including but not limited to generating a report containing security incidents ranked by their similarity to the new security incident.

As explained in connection with example method 400 in FIG. 4, a software security system may generate actionable lists of related security incidents by creating feature vectors for detected security incidents. These feature vectors may account for a wide range of information derived from the security incidents, and the systems and methods described herein may establish relationships between various security incidents based on the calculated feature vectors, and leverage these relationships to respond simultaneously to multiple related security incidents. The systems and methods may thereby improve the functioning of a software security system, such as NORTON INTERNET SECURITY, by enabling the software security system to provide lists of related security incidents to an administrator and/or security specialist and enabling that administrator and/or security specialist to respond simultaneously to multiple related incidents.

Figure 6:
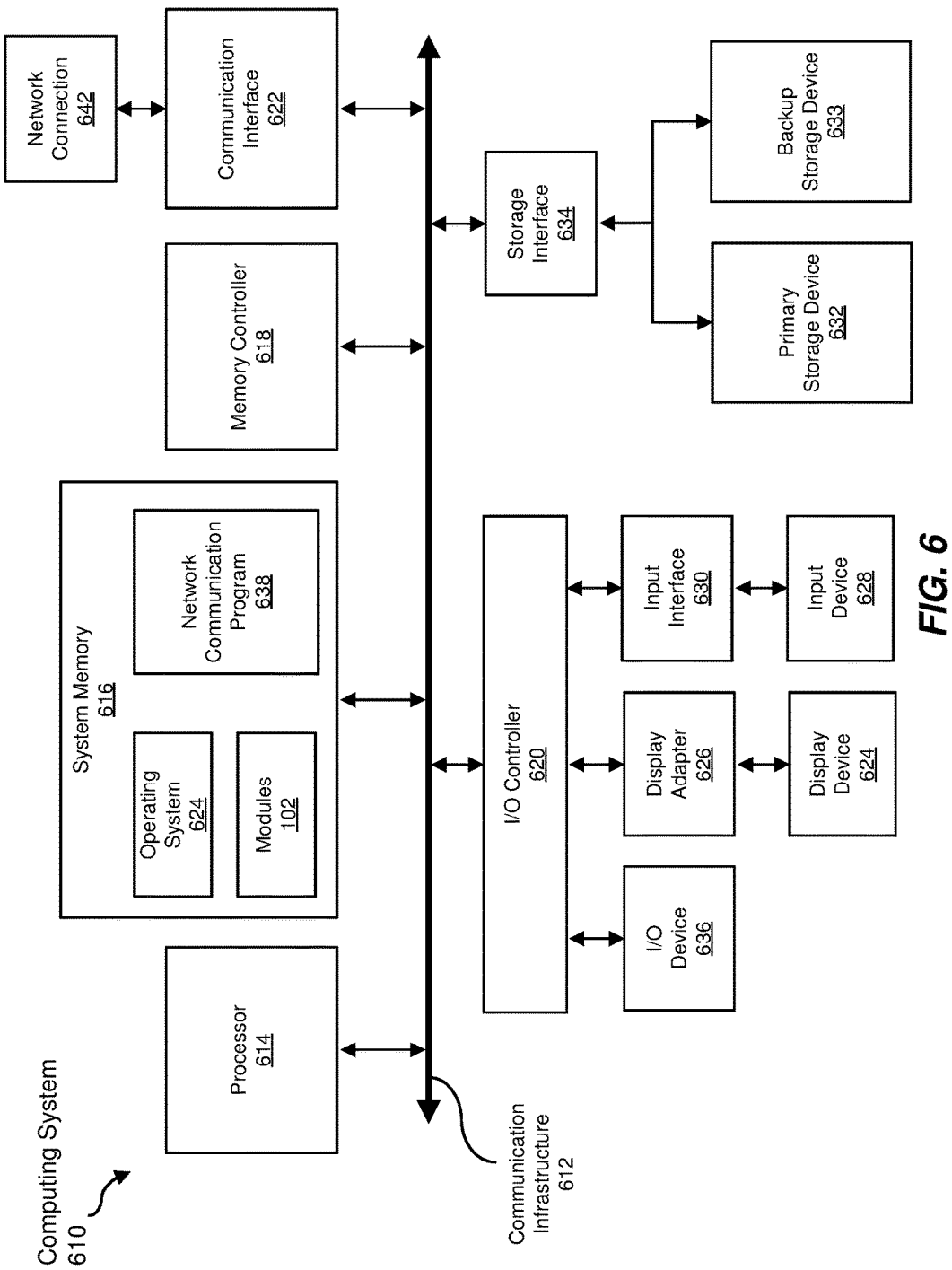
FIG. 6 is a block diagram of an example computing system capable of implementing one or more of the embodiments described and/or illustrated herein.

FIG. 6 is a block diagram of an example computing system 610 capable of implementing one or more of the embodiments described and/or illustrated herein. For example, all or a portion of computing system 610 may perform and/or be a means for performing, either alone or in combination with other elements, one or more of the steps described herein (such as one or more of the steps illustrated in FIG. 4). All or a portion of computing system 610 may also perform and/or be a means for performing any other steps, methods, or processes described and/or illustrated herein.

Computing system 610 broadly represents any single or multi-processor computing device or system capable of executing computer-readable instructions. Examples of computing system 610 include, without limitation, workstations, laptops, client-side terminals, servers, distributed computing systems, handheld devices, or any other computing system or device. In its most basic configuration, computing system 610 may include at least one processor 614 and a system memory 616.

Processor 614 generally represents any type or form of physical processing unit (e.g., a hardware-implemented central processing unit) capable of processing data or interpreting and executing instructions. In certain embodiments, processor 614 may receive instructions from a software application or module. These instructions may cause processor 614 to perform the functions of one or more of the example embodiments described and/or illustrated herein.

System memory 616 generally represents any type or form of volatile or non-volatile storage device or medium capable of storing data and/or other computer-readable instructions. Examples of system memory 616 include, without limitation, Random Access Memory (RAM), Read Only Memory (ROM), flash memory, or any other suitable memory device. Although not required, in certain embodiments computing system 610 may include both a volatile memory unit (such as, for example, system memory 616) and a non-volatile storage device (such as, for example, primary storage device 632, as described in detail below). In one example, one or more of modules 102 from FIG. 1 may be loaded into system memory 616.

In some examples, system memory 616 may store and/or load an operating system 624 for execution by processor 614. In one example, operating system 624 may include and/or represent software that manages computer hardware and software resources and/or provides common services to computer programs and/or applications on computing system 610. Examples of operating system 624 include, without limitation, LINUX, JUNOS, MICROSOFT WINDOWS, WINDOWS MOBILE, MAC OS, APPLE'S IOS, UNIX, GOOGLE CHROME OS, GOOGLE'S ANDROID, SOLARIS, variations of one or more of the same, and/or any other suitable operating system.

In certain embodiments, example computing system 610 may also include one or more components or elements in addition to processor 614 and system memory 616. For example, as illustrated in FIG. 6, computing system 610 may include a memory controller 618, an Input/Output (I/O) controller 620, and a communication interface 622, each of which may be interconnected via a communication infrastructure 612. Communication infrastructure 612 generally represents any type or form of infrastructure capable of facilitating communication between one or more components of a computing device. Examples of communication infrastructure 612 include, without limitation, a communication bus (such as an Industry Standard Architecture (ISA), Peripheral Component Interconnect (PCI), PCI Express (PCIe), or similar bus) and a network.

Memory controller 618 generally represents any type or form of device capable of handling memory or data or controlling communication between one or more components of computing system 610. For example, in certain embodiments memory controller 618 may control communication between processor 614, system memory 616, and I/O controller 620 via communication infrastructure 612.

I/O controller 620 generally represents any type or form of module capable of coordinating and/or controlling the input and output functions of a computing device. For example, in certain embodiments I/O controller 620 may control or facilitate transfer of data between one or more elements of computing system 610, such as processor 614, system memory 616, communication interface 622, display adapter 626, input interface 630, and storage interface 634.

As illustrated in FIG. 6, computing system 610 may also include at least one display device 624 coupled to I/O controller 620 via a display adapter 626. Display device 624 generally represents any type or form of device capable of visually displaying information forwarded by display adapter 626. Similarly, display adapter 626 generally represents any type or form of device configured to forward graphics, text, and other data from communication infrastructure 612 (or from a frame buffer, as known in the art) for display on display device 624.

As illustrated in FIG. 6, example computing system 610 may also include at least one input device 628 coupled to I/O controller 620 via an input interface 630. Input device 628 generally represents any type or form of input device capable of providing input, either computer or human generated, to example computing system 610. Examples of input device 628 include, without limitation, a keyboard, a pointing device, a speech recognition device, variations or combinations of one or more of the same, and/or any other input device.

Additionally or alternatively, example computing system 610 may include additional I/O devices. For example, example computing system 610 may include I/O device 636. In this example, I/O device 646 may include and/or represent a user interface that facilitates human interaction with computing system 610. Examples of I/O device 646 include, without limitation, a computer mouse, a keyboard, a monitor, a printer, a modem, a camera, a scanner, a microphone, a touchscreen device, variations or combinations of one or more of the same, and/or any other I/O device.

Communication interface 622 broadly represents any type or form of communication device or adapter capable of facilitating communication between example computing system 610 and one or more additional devices. For example, in certain embodiments communication interface 622 may facilitate communication between computing system 610 and a private or public network including additional computing systems. Examples of communication interface 622 include, without limitation, a wired network interface (such as a network interface card), a wireless network interface (such as a wireless network interface card), a modem, and any other suitable interface. In at least one embodiment, communication interface 622 may provide a direct connection to a remote server via a direct link to a network, such as the Internet. Communication interface 622 may also indirectly provide such a connection through, for example, a local area network (such as an Ethernet network), a personal area network, a telephone or cable network, a cellular telephone connection, a satellite data connection, or any other suitable connection.

In certain embodiments, communication interface 622 may also represent a host adapter configured to facilitate communication between computing system 610 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 622 may also allow computing system 610 to engage in distributed or remote computing. For example, communication interface 622 may receive instructions from a remote device or send instructions to a remote device for execution.

In some examples, system memory 616 may store and/or load a network communication program 648 for execution by processor 614. In one example, network communication program 648 may include and/or represent software that enables computing system 610 to establish a network connection 642 with another computing system (not illustrated in FIG. 6) and/or communicate with the other computing system by way of communication interface 622. In this example, network communication program 648 may direct the flow of outgoing traffic that is sent to the other computing system via network connection 642. Additionally or alternatively, network communication program 648 may direct the processing of incoming traffic that is received from the other computing system via network connection 642 in connection with processor 614.

Although not illustrated in this way in FIG. 6, network communication program 648 may alternatively be stored and/or loaded in communication interface 622. For example, network communication program 648 may include and/or represent at least a portion of software and/or firmware that is executed by a processor and/or Application Specific Integrated Circuit (ASIC) incorporated in communication interface 622.

As illustrated in FIG. 6, example computing system 610 may also include a primary storage device 632 and a backup storage device 633 coupled to communication infrastructure 612 via a storage interface 634. Storage devices 632 and 633 generally represent any type or form of storage device or medium capable of storing data and/or other computer-readable instructions. For example, storage devices 632 and 633 may be a magnetic disk drive (e.g., a so-called hard drive), a solid state drive, a floppy disk drive, a magnetic tape drive, an optical disk drive, a flash drive, or the like. Storage interface 644 generally represents any type or form of interface or device for transferring data between storage devices 632 and 633 and other components of computing system 610.

In certain embodiments, storage devices 632 and 633 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 632 and 633 may also include other similar structures or devices for allowing computer software, data, or other computer-readable instructions to be loaded into computing system 610. For example, storage devices 632 and 633 may be configured to read and write software, data, or other computer-readable information. Storage devices 632 and 633 may also be a part of computing system 610 or may be a separate device accessed through other interface systems.

Many other devices or subsystems may be connected to computing system 610. Conversely, all of the components and devices illustrated in FIG. 6 need not be present to practice the embodiments described and/or illustrated herein. The devices and subsystems referenced above may also be interconnected in different ways from that shown in FIG. 6. Computing system 610 may also employ any number of software, firmware, and/or hardware configurations. For example, one or more of the example embodiments disclosed herein may be encoded as a computer program (also referred to as computer software, software applications, computer-readable instructions, or computer control logic) on a computer-readable medium. The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 610. All or a portion of the computer program stored on the computer-readable medium may then be stored in system memory 616 and/or various portions of storage devices 632 and 633. When executed by processor 614, a computer program loaded into computing system 610 may cause processor 614 to perform and/or be a means for performing the functions of one or more of the example embodiments described and/or illustrated herein. Additionally or alternatively, one or more of the example embodiments described and/or illustrated herein may be implemented in firmware and/or hardware. For example, computing system 610 may be configured as an Application Specific Integrated Circuit (ASIC) adapted to implement one or more of the example embodiments disclosed herein.

Figure 7:
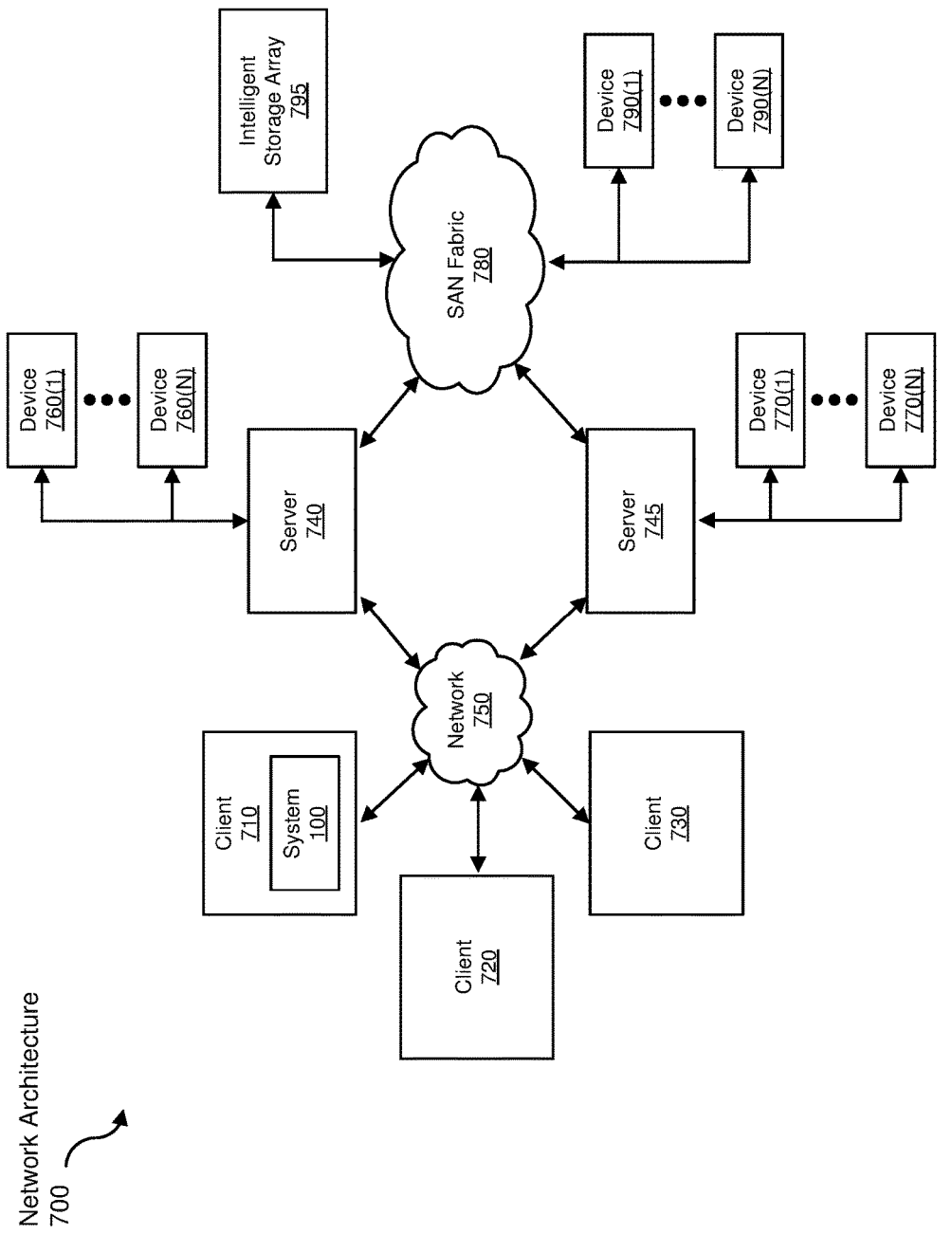
FIG. 7 is a block diagram of an example computing network capable of implementing one or more of the embodiments described and/or illustrated herein.

FIG. 7 is a block diagram of an example network architecture 700 in which client systems 710, 720, and 740 and servers 740 and 745 may be coupled to a network 750. As detailed above, all or a portion of network architecture 700 may perform and/or be a means for performing, either alone or in combination with other elements, one or more of the steps disclosed herein (such as one or more of the steps illustrated in FIG. 4). All or a portion of network architecture 700 may also be used to perform and/or be a means for performing other steps and features set forth in the instant disclosure.

Client systems 710, 720, and 740 generally represent any type or form of computing device or system, such as example computing system 610 in FIG. 6. Similarly, servers 740 and 745 generally represent computing devices or systems, such as application servers or database servers, configured to provide various database services and/or run certain software applications. Network 750 generally represents any telecommunication or computer network including, for example, an intranet, a WAN, a LAN, a PAN, or the Internet. In one example, client systems 710, 720, and/or 740 and/or servers 740 and/or 745 may include all or a portion of system 100 from FIG. 1.

As illustrated in FIG. 7, one or more storage devices 760(1)-(N) may be directly attached to server 740. Similarly, one or more storage devices 770(1)-(N) may be directly attached to server 745. Storage devices 760(1)-(N) and storage devices 770(1)-(N) generally represent any type or form of storage device or medium capable of storing data and/or other computer-readable instructions. In certain embodiments, storage devices 760(1)-(N) and storage devices 770(1)-(N) may represent Network-Attached Storage (NAS) devices configured to communicate with servers 740 and 745 using various protocols, such as Network File System (NFS), Server Message Block (SMB), or Common Internet File System (CIFS).

Servers 740 and 745 may also be connected to a Storage Area Network (SAN) fabric 780. SAN fabric 780 generally represents any type or form of computer network or architecture capable of facilitating communication between a plurality of storage devices. SAN fabric 780 may facilitate communication between servers 740 and 745 and a plurality of storage devices 790(1)-(N) and/or an intelligent storage array 795. SAN fabric 780 may also facilitate, via network 750 and servers 740 and 745, communication between client systems 710, 720, and 740 and storage devices 790(1)-(N) and/or intelligent storage array 795 in such a manner that devices 790(1)-(N) and array 795 appear as locally attached devices to client systems 710, 720, and 730. As with storage devices 760(1)-(N) and storage devices 770(1)-(N), storage devices 790(1)-(N) and intelligent storage array 795 generally represent any type or form of storage device or medium capable of storing data and/or other computer-readable instructions.

In certain embodiments, and with reference to example computing system 610 of FIG. 6, a communication interface, such as communication interface 622 in FIG. 6, may be used to provide connectivity between each client system 710, 720, and 740 and network 750. Client systems 710, 720, and 740 may be able to access information on server 740 or 745 using, for example, a web browser or other client software. Such software may allow client systems 710, 720, and 740 to access data hosted by server 740, server 745, storage devices 760(1)-(N), storage devices 770(1)-(N), storage devices 790(1)-(N), or intelligent storage array 795. Although FIG. 7 depicts the use of a network (such as the Internet) for exchanging data, the embodiments described and/or illustrated herein are not limited to the Internet or any particular network-based environment.

In at least one embodiment, all or a portion of one or more of the example embodiments disclosed herein may be encoded as a computer program and loaded onto and executed by server 740, server 745, storage devices 760(1)-(N), storage devices 770(1)-(N), storage devices 790(1)-(N), intelligent storage array 795, or any combination thereof. All or a portion of one or more of the example embodiments disclosed herein may also be encoded as a computer program, stored in server 740, run by server 745, and distributed to client systems 710, 720, and 740 over network 750.

As detailed above, computing system 610 and/or one or more components of network architecture 700 may perform and/or be a means for performing, either alone or in combination with other elements, one or more steps of an example method for responding to electronic security incidents.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered example in nature since many other architectures can be implemented to achieve the same functionality.

In some examples, all or a portion of example system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of example system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of example system 100 in FIG. 1 may be implemented within a virtual environment. For example, the modules and/or data described herein may reside and/or execute within a virtual machine. As used herein, the term "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the term "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of example system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of example system 100 in FIG. 1 may represent portions of, interact with, consume data produced by, and/or produce data consumed by one or more systems for information management. As used herein, the term "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of example system 100 in FIG. 1 may represent portions of, produce data protected by, and/or communicate with one or more systems for information security. As used herein, the term "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of example system 100 in FIG. 1 may represent portions of, communicate with, and/or receive protection from one or more systems for endpoint security. As used herein, the term "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the example embodiments disclosed herein.

In addition, one or more of the modules described herein may transform data, physical devices, and/or representations of physical devices from one form to another. For example, one or more of the modules recited herein may receive a collection of security incidents to be transformed, extract features from each security incident, use a result of the extraction to calculate feature vectors for each incident, use the feature vectors to calculate degrees of similarity between the security incidents, use a result of the calculation to generate a security report, output the security report to a storage device, provide the security report to a system administrator, use information contained in the security report to address multiple security incidents, and/or generate a new security incident based on the information contained in the security report. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the example embodiments disclosed herein. This example description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for responding to electronic security incidents, at least a portion of the method being performed by a computing device comprising at least one processor, the method comprising:

causing an identification module executed by the at least one processor to identify, by a software security system that is configured to detect abnormal activity within a computing system, a plurality of security incidents, wherein each security incident in the plurality of security incidents represents an instance of abnormal activity that occurred within the computing system and calls for a security response;

establishing relationships among the plurality of security incidents by, for each security incident in the plurality of security incidents:

causing a vector module executed by the at least one processor to calculate a feature vector of the security incident that indicates at least one feature of the security incident;

causing a similarity module executed by the at least one processor to calculate a degree of similarity between the security incident and an additional security incident in the plurality of security incidents based at least in part on comparing the feature vector of the security incident to a feature vector of the additional security incident; and causing a creation module executed by the at least one processor to create an association between the security incident and the additional security incident that reflects the degree of similarity between the security incident and the additional security incident; and causing a security module executed by the at least one processor to trigger, by the software security system and based on associations among the plurality of security incidents, a security action that responds to at least both the security response called for by the security incident and the security response called for by the additional security incident.

2. The method of claim 1, wherein triggering the security action comprises generating a report comprising a plurality of related security incidents that are associated with the security incident and the additional security incident.

3. The method of claim 2, wherein generating the report comprises sorting the plurality of related security incidents based on the degree of similarity of each incident to the security incident.

4. The method of claim 2, further comprising providing the report to an administrator of at least one computing system involved in the security incident.

5. The method of claim 4, wherein providing the report to the administrator comprises displaying the contents of the report through a graphical user interface that enables the administrator to respond simultaneously to at least the security incident and the additional security incident.

6. The method of claim 1, wherein creating the association between the security incident and the additional security incident is based on the degree of similarity satisfying a similarity threshold.

7. The method of claim 6, wherein triggering the security action comprises automatically adjusting the similarity threshold based on the number of additional security incidents that are associated with the security incident to generate an actionable list of security incidents that are associated with the security incident.

8. The method of claim 1, wherein the security action comprises generating a new security incident based on the relationship between at least the security incident and the additional security incident.

9. The method of claim 1, wherein the feature vector that comprises at least one feature of the security incident comprises at least one of:

a hostname of a computing device affected by the security incident;

a classification of the computing device affected by the security incident;

an Internet Protocol (IP) address that, when accessed, triggered the security incident;

a domain name that, when accessed, triggered the security incident;

a Uniform Resource Locator (URL) that, when accessed, triggered the security incident;

a user of a computing system affected by the security incident;

a group of users affected by the security incident;

a physical location of computing systems affected by the security incident;

an e-mail address that facilitated the security incident;

a file that, when present on a victim computing system, triggered the security incident;

a software application that, when present on the victim computing system, triggered the security incident; and a digital signature that represents a signing authority that signed files involved in the security incident and the additional security incident.

10. A system for responding to electronic security incidents, the system comprising:

an identification module, stored in memory, that identifies, by a software security system that is configured to detect abnormal activity within a computing system, a plurality of security incidents, wherein each security incident in the plurality of security incidents represents an instance of abnormal activity that occurred within the computing system and calls for a security response;

a vector module, stored in memory, that calculates, for each security incident in the plurality of security incidents, a feature vector that indicates at least one feature of the security incident;

a similarity module, stored in memory, that calculates a degree of similarity between the security incident and an additional security incident in the plurality of security incidents based at least in part on comparing the feature vector of the security incident to a feature vector of the additional security incident;

a creation module, stored in memory, that creates an association between the security incident and the additional security incident that reflects the degree of similarity between the security incident and the additional security incident;

a security module, stored in memory, that triggers, by the software security system and based on associations among the plurality of security incidents, a security action that responds to at least both the security response called for by the security incident and the security response called for by the additional security incident; and at least one physical processor configured to execute the identification module, the vector module, the similarity module, the creation module, and the security module.

11. The system of claim 10, wherein the security module triggers the security action by generating a report comprising a plurality of related security incidents that are associated with the security incident and the additional security incident.

12. The system of claim 11, wherein the security module generates the report by sorting the plurality of related security incidents based on the degree of similarity of each incident to the security incident.

13. The system of claim 11, wherein the security module provides the report to an administrator of at least one computing system involved in the security incident.

14. The system of claim 13, wherein the security module provides the report to the administrator by displaying the contents of the report through a graphical user interface that enables the administrator to respond simultaneously to at least the security incident and the additional security incident.

15. The system of claim 10, wherein the creation module creates the association between the security incident and the additional security incident is based on the degree of similarity satisfying a similarity threshold.

16. The system of claim 15, wherein the security module triggers the security action comprises automatically adjusting the similarity threshold based on the number of additional security incidents that are associated with the security incident to generate an actionable list of security incidents that are associated with the security incident.

17. The system of claim 10, wherein the security module generates a new security incident based on the relationship between at least the security incident and the additional security incident.

18. The system of claim 10, wherein the feature vector that comprises at least one feature of the security incident comprises at least one of:
- a hostname of a computing device affected by the security incident;
- a classification of the computing device affected by the security incident;
- an Internet Protocol (IP) address that, when accessed, triggered the security incident;
- a domain name that, when accessed, triggered the security incident;
- a Uniform Resource Locator (URL) that, when accessed, triggered the security incident;
- a user of a computing system affected by the security incident;
- a group of users affected by the security incident;
- a physical location of computing systems affected by the security incident;
- an e-mail address that facilitated the security incident;
- a file that, when present on a victim computing system, triggered the security incident;
- a software application that, when present on the victim computing system, triggered the security incident; and
- a digital signature that represents a signing authority that signed files involved in the security incident and the additional security incident.

19. A non-transitory computer-readable medium comprising one or more computer-readable instructions that, when executed by at least one processor of a computing device, cause the computing device to:
- cause an identification module executed by the at least one processor to identify, by a software security system that is configured to detect abnormal activity within a computing system, a plurality of security incidents, wherein each security incident in the plurality of security incidents represents an instance of abnormal activity that occurred within the computing system and calls for a security response;
- establish relationships among the plurality of security incidents by, for each security incident in the plurality of security incidents:
  - causing a vector module executed by the at least one processor to calculate a feature vector that indicates at least one feature of the security incident;
  - causing a similarity module executed by the at least one processor to calculate a degree of similarity between the security incident and an additional security incident in the plurality of security incidents based at least in part on comparing the feature vector of the security incident to a feature vector of the additional security incident; and
  - causing a creation module executed by the at least one processor to create an association between the security incident and the additional security incident that reflects the degree of similarity between the security incident and the additional security incident; and
- causing a security module executed by the at least one processor to trigger, by the software security system and based on associations among the plurality of security incidents, a security action that responds to at least both the security response called for by the security incident and the security response called for by the additional security incident.

20. The non-transitory computer-readable medium of claim 19, wherein the one or more computer-readable instructions cause the security module to generate a report comprising a plurality of related security incidents that are associated with the security incident and the additional security incident.

* * * * *